US012750781B2

(12) United States Patent
Mazloum et al.

(10) Patent No.: US 12,750,781 B2
(45) Date of Patent: Sep. 29, 2026

(54) METHODS FOR HANDLING LOW ENERGY CONDITIONS OF AN ENERGY HARVESTING WIRELESS DEVICE, A RELATED NETWORK NODE AND A RELATED WIRELESS DEVICE

(71) Applicant: Sony Group Corporation, Tokyo (JP)

(72) Inventors: Nafiseh Seyed Mazloum, Lund (SE); Torgny Palenius, Barsebäck (SE); Basuki Priyanto, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 315 days.

(21) Appl. No.: 18/290,795

(22) PCT Filed: Aug. 26, 2022

(86) PCT No.: PCT/EP2022/073764

§ 371 (c)(1),
(2) Date: Jan. 21, 2024

(87) PCT Pub. No.: WO2023/031033

PCT Pub. Date: Mar. 9, 2023

(65) Prior Publication Data

US 2024/0373359 A1 Nov. 7, 2024

(30) Foreign Application Priority Data

Aug. 30, 2021 (SE) .................................... 2151086-2

(51) Int. Cl.
*H04W 52/02* (2009.01)
*H02J 50/00* (2016.01)
*H04L 5/00* (2006.01)

(52) U.S. Cl.
CPC ....... *H04W 52/0235* (2013.01); *H02J 50/001* (2020.01); *H04L 5/0053* (2013.01)

(58) Field of Classification Search
CPC ......... H04W 52/0235; H04W 52/0225; H04W 52/0245; H02J 50/001; H02J 2310/22;
(Continued)

(56) References Cited

U.S. PATENT DOCUMENTS

2015/0201342 A1* 7/2015 Vannithamby ............ H04L 5/14 370/254
2017/0041915 A1 2/2017 Gupta
(Continued)

FOREIGN PATENT DOCUMENTS

WO 2020091643 A1 5/2020
WO 2020254046 A1 12/2020
WO WO 2021155209 A1 * 8/2021

OTHER PUBLICATIONS

International Search Report and Written Opinion from corresponding International Application No. PCT/EP2022/073764, mailed on Dec. 7, 2022, 12 pages.
(Continued)

*Primary Examiner* — Rushil P. Sampat
(74) *Attorney, Agent, or Firm* — Tucker Ellis LLP

(57) ABSTRACT

A method is disclosed, performed by a network node, for handling low energy conditions of an energy harvesting wireless device (WD). The network node stores a UE context of the WD received in a registration procedure of the WD with the network. The method includes receiving by the network node a message from the WD, wherein the message indicates that the WD has insufficient power level for performing regular radio operations for an upcoming message exchange. The message further indicates that the UE context of the WD is to be preserved for a time period during which the power level is insufficient.

20 Claims, 8 Drawing Sheets

(58) Field of Classification Search
CPC ... H02J 50/20; H02J 50/80; H02J 7/34; H04L 5/0053; Y02D 30/70
See application file for complete search history.

(56) References Cited

U.S. PATENT DOCUMENTS

| | | | | |
|---|---|---|---|---|
| 2018/0019871 | A1 | 1/2018 | Gage | |
| 2019/0182702 | A1 | 6/2019 | Wang | |
| 2022/0352751 | A1* | 11/2022 | Elshafie | H02J 50/23 |
| 2023/0076409 | A1* | 3/2023 | Elkotby | H02J 50/001 |
| 2024/0333029 | A1* | 10/2024 | Xiong | H04W 52/0261 |

OTHER PUBLICATIONS

Search Report from corresponding Swedish Application No. 2151086-2, dated Apr. 26, 2022, 7 pages.
Nguyen, Thien D. et al., "An Adaptive MAC Protocol for RF Energy Harvesting Wireless Sensor Networks," 2016 IEEE Global Communications Conference (GLOBECOM), 2016, 6 pages.
Lin, Hsiang-Ho et al., "DeepSleep: IEEE 802.11 Enhancement for Energy Harvesting Machine-to-Machine Communications," 2012 IEEE Global Communications Conference (GLOBECOM), 2012, 6 pages.
Abbas, Zeeshan et al., "A Survey on Energy Conserving Mechanisms for the Internet of Things: Wireless Networking Aspects," Sensors, vol. 2015, ISSN 1424-8220, 2015, 30 pages.

* cited by examiner

METHODS FOR HANDLING LOW ENERGY CONDITIONS OF AN ENERGY HARVESTING WIRELESS DEVICE, A RELATED NETWORK NODE AND A RELATED WIRELESS DEVICE

The present disclosure pertains to the field of wireless communications. The present disclosure relates to methods for handling low energy conditions of an energy harvesting wireless device, a related network node and a related wireless device.

BACKGROUND

Future services will likely require cellular connectivity everywhere, anytime and in everything. This means that the number of devices that have to be wirelessly connected, which are also referred to as internet of Things (IoT) devices, is going to explode. A vast majority of these devices are battery powered and their batteries need to be recharged or replaced.

Changing/recharging batteries manually is not feasible, e.g., a trillion-IoT device in the world with 10-year battery life-time means that in total ~274 billion batteries needs changing every day. In an IoT context, 10-years battery life means a 10-years battery operation without charging which cannot even be fulfilled in many applications.

Recycling batteries is another factor that needs to be taken into account, for instance in 2018 191 000 tones of portable batteries were sold in the EU but only near half the amount, i.e., 88 000 tones of used portable batteries were collected as waste to be recycled.

This means that new approaches need to be used to sustain the world's battery requirement since these materials are very limited. Energy harvesting is a potential candidate that can help avoid an exploding request for batteries in the world and keep the limited natural materials un-harvested.

For certain application of IoT devices, for example devices that are placed in difficult to reach and/or remote locations, it may be difficult to charge the device frequently and/or manually. This kind of IoT-device may typically be reporting sensor outputs infrequently. It may be equipped with a limited battery capacity. Hence, it may be charged in full capacity using energy harvesting.

Harvesting resources, however, might not be available all the time especially if they are harvested from ambient or natural resources. The harvesting capabilities also depend on whether a device is stationary in an indoor or outdoor environment or is a mobile device as the intensity of energy harvesting can vary based on its location and its activity. Consequently, the device might not be able to communicate with the network or other devices during a certain period when the instantaneous harvesting energy is not available, not enough and/or the stored energy level drops below a certain level. This condition may typically lead to excessive unnecessary signaling which may increase the overhead and usage of unnecessary energy resources when the device has harvested enough energy and restarts communication.

SUMMARY

Accordingly, there is a need for devices and methods for handling low energy conditions of an energy harvesting wireless device, which may mitigate, alleviate, or address the existing shortcomings and may provide a solution that reduces energy consumption and latency for communications with an energy harvesting device.

A method is disclosed, performed by a network node, for handling low energy conditions of an energy harvesting wireless device, WD. The network node has stored a UE context of the WD received during a registration procedure with the WD. The method comprises receiving, from the WD, a message indicating that the WD has insufficient power level for performing regular radio operation for upcoming message exchange and indicating that the UE context of the WD is to be preserved for a time period during which the power level is insufficient.

Further, a network node is provided, the device comprising memory circuitry, processor circuitry, and a wireless interface, wherein the network node is configured to perform any of the methods disclosed herein for the network node.

It is an advantage of the present disclosure that the network node may be informed by the WD that the WD may have insufficient energy level for performing an upcoming message exchange and that the WD intends to resume communication with the network node upon harvesting a sufficient level of energy. Thereby, the network is aware that the WD, although it may not respond to signaling from the network node, has not left the network. The network node may thus indicate and/or convey to the network, such as to the core network, to preserve the UE context of the WD until the WD has a sufficient energy level and resumes communication with the network node. Since the UE context of the WD can be preserved, the WD is not required to perform a time consuming and energy draining registration procedure with the network to resume communications. A further advantage of the present disclosure is thus a reduced latency in the communication and/or a reduced energy consumption of the WD. Reduced energy consumption further reduces the time the WD is unavailable for communication.

A method is disclosed, performed by an energy harvesting wireless device (WD) for handling low energy conditions of the WD. The WD has a UE context generated during a registration procedure with the network node stored in the network. The method comprising determining whether an energy level of the WD is sufficient for performing regular radio operation for an upcoming message exchange. The method comprises, upon determining that the energy level is insufficient for performing regular radio operation for the upcoming message exchange, transmitting S203, to the network node, a message indicating that the WD has insufficient power level for performing regular radio operation for upcoming message exchange. The method comprises indicating that the UE context of the WD is to be preserved for a time period during which the power level is insufficient.

Further, a wireless device is provided, the device comprising memory circuitry, processor circuitry, and a wireless interface, wherein the wireless device is configured to perform any of the methods disclosed herein for the wireless device.

It is an advantage of the present disclosure that the WD may inform the network that the WD may have insufficient energy level for performing an upcoming message exchange and that the WD intends to resume communication with the network node upon harvesting a sufficient level of energy. Thereby, the network may be made aware that the WD, although it may not respond to signaling from the network node, has not left the network. The network node may indicate to the network, such as to the core network, to preserve the UE context of the WD until the WD has a sufficient energy level and resumes communication with the network node. Since the UE context of the WD can be preserved, the WD is not required to perform a time consuming and energy draining registration procedure with the network to resume communications. A further advantage of the present disclosure is thus a reduced latency in the communication and/or a reduced energy consumption of the WD. Reduced energy consumption further reduces the time the WD is unavailable for communication.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
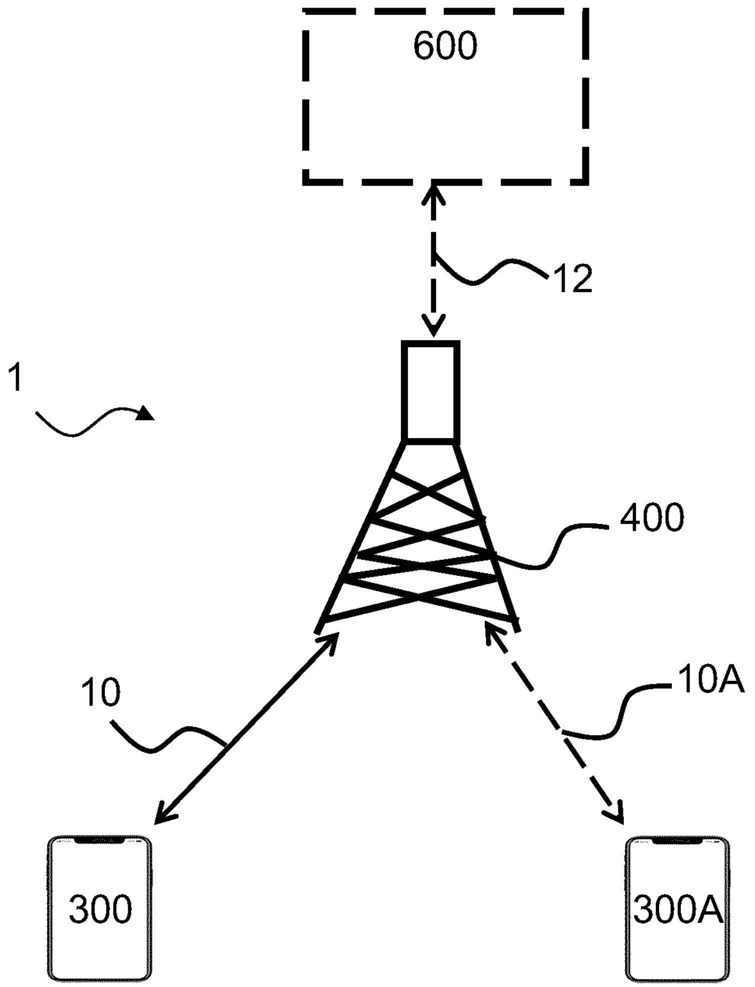
FIG. 1 is a diagram illustrating an example wireless communication system comprising an example network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

A connected mode may be referred to an operation mode wherein a data transmission can be communicated e.g., between the wireless device and a network node or between the wireless device and another wireless device. A connected mode may be referred to an operation state wherein a radio transmitter and/or a radio receiver is activated for such communication. A connected mode may be referred to an operation state wherein the wireless device is synchronized time-wise and/or frequency-wise e.g., by a determined timing advance parameter for the communication. Furthermore, it may be referred to as an operation state wherein transfer of unicast data to/from the wireless device can be performed. In certain communication systems, a connected mode may be referred to a radio resource control (RRC) state. In various examples, an active state may be a RRC connected state and/or an RRC active state. However, a connected mode may be an active period within another RRC state.

The dormant mode is a mode where the UE has no active connection with the network node. A dormant mode may be seen as an inactive mode of the wireless device. A dormant mode may be seen as a mode where the wireless device is unsynchronized with a timing of a network. In one or many examples the wireless device may in a dormant mode not have a valid timing advance information with respect to the network. A dormant mode may be seen as a mode where the wireless device may not be able to receive dedicated signaling. A dormant mode may be seen as a mode where closed loop power control is inactivated or suspended. Dormant mode may comprise RRC idle mode, RRC suspend and/or RRC inactive mode. For example, the wireless device may be in dormant mode when the connection with the network node has been released and/or suspended.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example core network (CN) node 600, a radio network node 400 and an example wireless device (WD) 300 according to this disclosure.

As discussed in detail herein, the present disclosure relates to a wireless communication system 1 comprising a cellular system, for example, a 3GPP wireless communication system. The wireless communication system 1 comprises a WD 300 and/or a network node 400. The WD 300 may be an energy harvesting wireless device configured use energy harvesting sources to harvest the energy required by the WD 300 for communicating with the network node 400 or a second WD 300A.

A network node disclosed herein refers to a radio access network (RAN) node operating in the radio access network or a CN node operating in the core network. The RAN node may be one or more of a base station, an evolved Node B, eNB, gNB in NR. In one or more examples, the RAN node is a functional unit which may be distributed in several physical units.

A core network, CN, node disclosed herein refers to a network node operating in the core network, such as in the Evolved Packet Core Network, EPC, and/or a 5G Core Network, 5 GC. Examples of CN nodes in EPC include a Mobility Management Entity, MME. Examples of CN nodes in 5 GC include Access and Mobility Management Function (AMF) and Service Management Function (SMF). In one or more examples, the CN node is a functional unit which may be distributed in several physical units.

The CN node 600 may be configured to communicate with the RAN node 400 via a link, such as a wired link, 12.

The wireless communication system 1 described herein may comprise one or more wireless devices 300, 300A, and/or one or more network nodes 400, such as one or more of: a base station, an eNB, a gNB and/or an access point, and one or more CN nodes 600.

A wireless device may refer to a mobile device, a user equipment (UE) and/or other devices having wireless capability, such as e.g., sensors wirelessly transmitting the measured data.

The wireless device 300, 300A may be configured to communicate with the network node 400 via a wireless link (or radio access link) 10, 10A.

Energy harvesting resources for harvesting energy by the WD might not be available all the time, especially if the energy harvesting resources are ambient or natural resources.

Additionally, the amount of energy that can be stored in a WD may be limited and the WD may thus run out of the back-up stored energy if the WD is not able to harvest energy. Consequently, the WD might not be able to communicate with the network or other devices during a certain period when the instantaneous harvesting energy is not enough and/or the stored energy level drops below a certain level. During this period the WD may currently get unregistered from the network, such as from the core network. When the WD gets unregistered from the network the network may discard the UE context for the WD. UE context may be seen as a set of information associated with a UE, such as the WD, that may be advantageous and/or necessary for communication with the core network, such as to maintain one or more services, such as to support one or more radio bearers, such as for Quality-of-service classes. For example, the UE context may comprise information indicative of a capability of the UE, and/or information indicative of the UE state and/or security information, and/or subscription identifiers and/or mobility information, such as defined in 3GPP TS 36.410 v. 16.0.0. and TS 23.502 v. 16.9.0 The UE context may be used to enable faster resuming to active state from e.g., idle state, e.g., from a state with lower energy level as disclosed herein. The UE context may comprise an EPS Radio Access Bearer (E-RAB) context, security context, roaming and access restrictions, UE S1 signaling connection ID(s). The UE context may be a set of information agreed upon between the WD and the network node during a registration procedure of the WD with the network. To resume communication the WD thus has to repeat all the registration signaling when the device has (harvested) sufficient energy for communication. When the WD is registered to the network it may also have to periodically update the registration, for example with a Periodic Registration Update to the Core Network, to notify the network that the WD is still reachable, such as by the network node. The WD may also perform Mobility Registration Updates when it has moved to another tracking area of the network, in order for the network to be able to page the WD. This signaling is power-consuming, which may lead to the energy level dropping significantly due to the registration signaling, sometimes to the extent that the energy level after performing the registration signaling is insufficient for upcoming message exchange. The tracking area update period is given from the Network, as defined in 3rd Generation Partnership Program (3GPP) TS 23.501 v. 17.1.1. If the WD does not send a tracking area update the Network may unregister the WD since it is not reachable and the location of the WD is unknown. For example, in case the WD is not able to respond to paging from the network or is not able to communicate with the network according to legacy RRC Connected mode or RRC Idle mode procedures, the network while have no understanding of the WD's where abouts, and hence believe and decide that the WD has left the network and will de-register the WD, such as the UE context of the WD, from the network.

Figure 2:
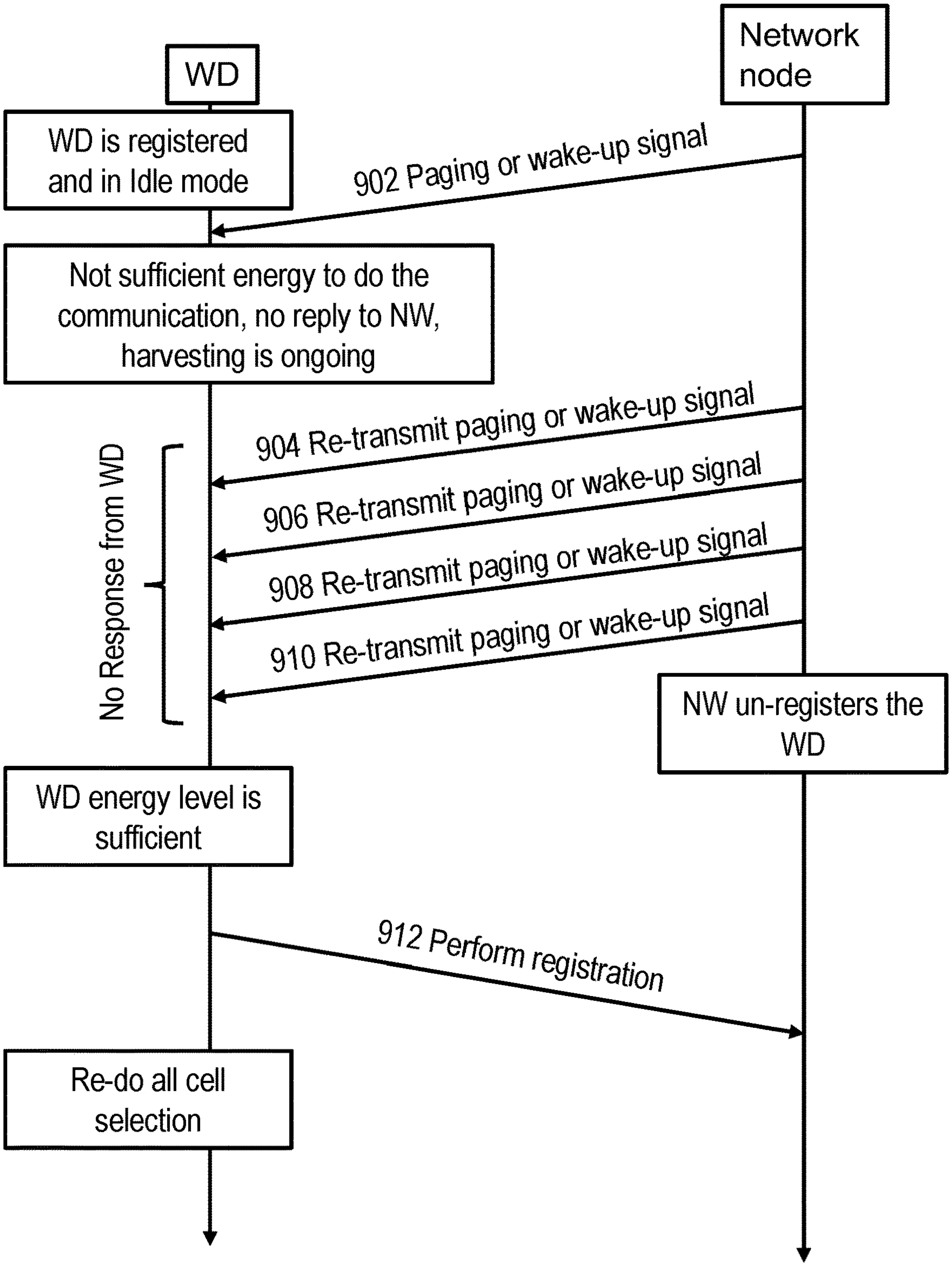
FIG. 2 is a signaling diagram illustrating an exemplary message exchange between a network node and a legacy WD.

FIG. 2 shows an example behavior for legacy WDs that are registered to the network, such as have a UE context with the network and are in IDLE mode. The network node transmits a paging signal or wake-up signal 902 to the WD. In this example, the WD does not have sufficient energy to response to the paging or wake-up signal from the network node. The network, however, does not have any information on this and continues re-transmitting paging or wake-up signals 904, 906, 908, 910 to the WD. In 904, 908, and/or 910, the network may escalate the paging procedure, such as involving more cells within the same tracking area, in which it will increase the amount of the signaling in the network. After a certain time period of not receiving any response from the WD, the network assumes that the WD is not available anymore and the network un-registers the WD, such as un-registers the UE context of the WD. When the energy level of the WD has reached a sufficient level, the WD performs a registration procedure 912 with the network node, to re-register to the network.

The present disclosure provides a solution that alleviates or addresses the existing shortcomings, such as the shortcomings mentioned in relation to the method shown in FIG. 2. The present disclosure provides a solution that allows the WD to inform the network of its insufficient energy level in advance, so that the WD can remain connected with the network, without being unregister, until the WD has harvested enough energy to resume communication with the network.

According to the present disclosure, the WD using energy harvesting can, when an event related to the energy level is triggered, indicate a communication condition, a traffic condition and/or remaining stored energy of the WD to the network or to other WDs. Thereby, the network and/or the other WDs can be made aware of the reason for not receiving a response from the WD and may does refrain from unregistering the WD. This allows the WD to stay connected with the network, without being dropped-out or getting unregistered, which reduces the signaling required by the WD for resuming communication once a sufficient energy level has been harvested.

The communication condition and/or traffic condition may be indicative of a current operation that may drain the stored energy of the WD. The communication condition and/or the traffic condition may be used by the network node to receive information about the operating conditions of the WD. Furthermore, the network node can also inform the WD on traffic conditions of an expected upcoming, such as subsequent message exchange. The network node may in one or more example methods transmit the traffic conditions via a paging message or via wake-up signaling).

In one or more example methods, the communication condition and/or traffic condition can be defined as the number of uplink and downlink transmissions and/or receptions (such as Physical Uplink Shared Channel (PUSCH), Physical Downlink Shared Channel (PDSCH), Physical Uplink Control Channel (PUCCH), and/or Physical Downlink Control Channel (PDCCH) transmission and/or receptions), or the number of messages within a certain duration of time.

In one or more example methods, the communication and/or traffic conditions (e.g., in RRC connected, in RRC-Inactive and in RRC Idle mode) can be predefined conditions, such as:

- Heavy WD uplink and/or downlink transmission. The heavy WD transmission indicates that the WD is expected to perform operation that may rapidly drain the energy storage device,
- Mild or medium WD uplink and/or downlink transmission. This may indicate a small to medium size of data transmission that is reported for example every tenth second or in a period of a few minutes (such as a limited amount of data for a limited period of time of time), and/or Low WD uplink and/or downlink transmission. This may indicate small amounts and infrequent transmission of data, such as sensor data that is transmitted for short periods and relatively long intervals. For example, a small data transmission (e.g., a few bytes) that is reported every a few-hours or days.

The event related to the energy harvesting may be one or more of:

The stored energy in WD's energy storage, such as in a capacitor or small battery of the WD, falling below a certain level and/or the instantaneous energy from harvesting resources is expected not enough to operate a communication circuitry of the WD. In one or more example methods, this may occur when the energy-harvesting WD has finished a communication and expects that there may not be enough energy to continue any potential communication, such as insufficient, energy remains. In one or more example methods, this may occur when an energy-harvesting WD is in the middle of communication and the energy goes below a certain level.

When the network, such as the network node, or other WDs have initiated communication with the energy-harvesting WD, for example through paging or by transmitting a wake-up signal or any other communication message.

The transmission of the indication of the communication condition and/or remaining stored energy can be done through one or more of the following.

In one or more example methods, the information related to the communication condition and/or traffic condition may be represented in bitmap format.

In one or more example methods the energy level status of the WD may be transmitted together with the aforementioned indication. The network may have better knowledge if the network knows both communication/traffic conditions and the energy level of the status of the WD. For example, the network may be informed on how long the wireless device can continue the communication before the WD needs to harvest the energy.

The indication can be done via several different specified codes where each code can contain a certain information. The WD may in some conditions, such as when the energy level is below a certain level for powering the ordinary radio transmitter and receiver, not be able to start the ordinary radio receiver and transmitter. The WD may however want to indicate to the network that it will be available for communication once sufficient energy is available. In one or more example methods this may be indicated by transmitting predefined codes to the network or nearest WD, such as using back-scattering type transmission. Assume the indication can be done via code A, code B, or code C. Transmission of these codes may for example indicate:

Code A: neither harvesting nor stored energy available, wait certain minutes/hours Code B: no storage device is available and harvesting energy is possible with certain min/hours Code C: harvesting and recharging storage device is on-going, pause the ongoing communication and continue after a certain time period Acknowledgement (ACK) and/or Non-Acknowledgement (NACK) in response to receiving a message from the network node, such as a paging message or wake-up signaling, where ACK indicates that the WD can continue the operation and communication as normal or as indicated by the network, and NACK indicates that the WD cannot resume communications as normal due to insufficient energy level. In one or more example methods, NACK includes additional information such as energy level, such as WD low-energy level, and the WD's potential capability of harvesting energy, and/or the time the WD needs to harvest a sufficient energy level for communication.

When the WD is in RRC Connected mode, the indication may be transmitted as a new bits or new information element (IE) via e.g., UE assistance information or together with other UL transmissions.

When the WD is in RRC Idle or RRC inactive mode, the indication may be transmitted as a new information bit or new IE using Small Data Transmission (SDT) or legacy random-access procedure. This avoids the WD entering connected mode, and hence saving energy of the WD, if just for a communication status or energy level update.

In one or more example methods, upon the network node receiving the low energy level indication from the WD in connected mode, the network terminates and releases the WD to either Idle mode or Inactive mode within a certain time period.

In one or more example methods, upon the network node receiving the low energy level indication from the WD in connected mode, the network reduces the data rate for upcoming message exchange and remains in connected mode, based on the severity of the energy level and the energy harvesting situation. For example, if the energy level and the energy harvesting situation is sufficient for communicating with the reduced data rate.

Figure 3:
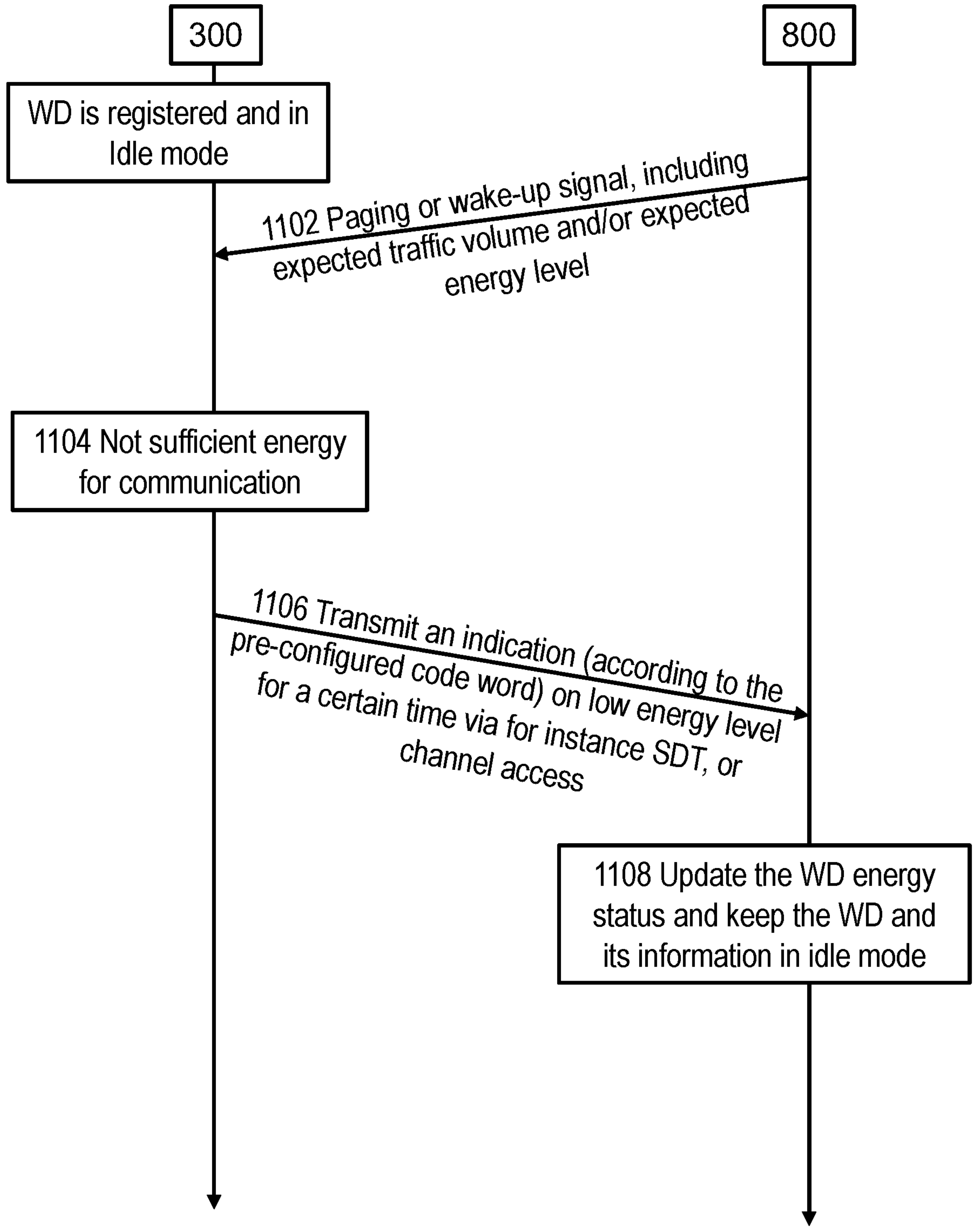
FIG. 3 is a signaling diagram illustrating a message exchange according to one or more example methods for handling low energy levels of an energy harvesting WD according to this disclosure.

FIG. 3 shows a message exchange between a WD 300 and a network node 800 according to one or more example methods disclosed herein. The network node 800 may be a RAN node 400 or a CN node 600 communicating with the WD 300 via a RAN node 400. The WD has performed a registration process and is registered to the network. In other words, the WD has a UE context with the network. The WD operates in IDLE mode.

The network node transmits a message 1102 indicative of expected properties, such as an expected traffic volume and/or expected energy level, of an upcoming message exchange to the WD. The message may be a paging message or a wake-up signal comprising the expected properties as additional information.

The WD predicts 1104, based on its potential harvesting capability, that its energy level is not sufficient for the message exchange indicated by the network node.

The WD transmits a message 1106 to the network node indicating that the WD has insufficient power level for performing regular radio operation for the upcoming message exchange. The indication may be transmitted according to a pre-configured and/or pre-specified code-word, indicative of the WDs insufficient energy level and a certain time period for which the energy level will be insufficient. The indication may be transmitted using SDT or early channel access messages, such as via a RACH procedure. The WD being unable to perform regular radio operation means that no communication can be performed, such as due to insufficient energy level. Regular radio operation herein means in accordance with (3GPP) TS spec or agreement, for example responding to paging, updates etc. Hence, not regular radio operation means that one or more activities (receive and/or transmit) that the WD would normally do if it would have enough power is skipped.

Upon receiving the message indicating that the WD has insufficient power level, the network, such as the network node, may update an energy status 1108 of the WD. The network node may keep the WD and its corresponding information, such as the UE context of the WD, for operation in IDLE mode. In other words, the network preserves the UE context of the WD in the core network until the WD has harvested a sufficient energy level for communicating with the network node, such as for the upcoming message exchange.

The procedure above may optionally be followed by a message from the WD to the network node indicating that the WD has sufficient energy for resuming communication.

Figure 4:
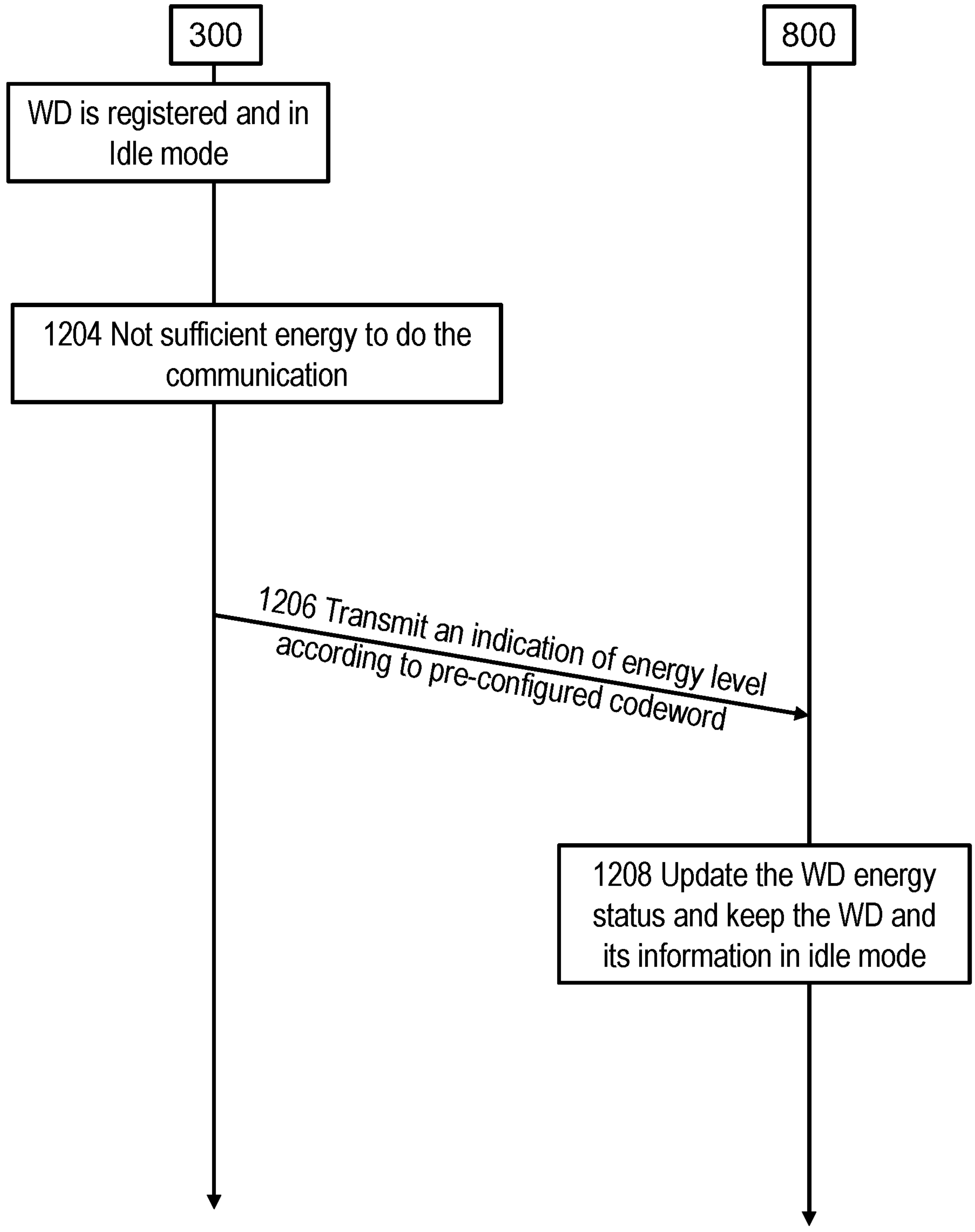
FIG. 4 is a signaling diagram illustrating a message exchange according to one or more example methods for handling low energy levels of an energy harvesting WD according to this disclosure.

FIG. 4 shows a message exchange between the WD 300 and the network node 800 according to one or more example methods disclosed herein. The network node 800 may be a RAN node 400 or a CN node 600 communicating with the WD 300 via a RAN node 400. The WD has performed a registration process and is registered to the network. In other words, the WD has a UE context with the network. Similar to the example shown in FIG. 3 the WD operates in IDLE mode. However, in the one or more example methods shown in FIG. 4, the transmitting of the message indicating insufficient energy level is not triggered by the WD receiving a message from the network node.

Instead, the WD reaches a predetermined energy level and predicts 1204, based on its potential harvesting capability, that its energy level is not sufficient for an upcoming message exchange.

The WD transmits an un-solicitated message 1206 to the network node indicating that the WD has insufficient power level for performing regular radio operation for the upcoming message exchange. The indication may be transmitted according to a pre-configured and/or pre-specified codeword, e.g., Code A, Code B or Code C as described earlier, indicative of the WDs insufficient energy level and a certain time period for which the energy level will be insufficient. The indication may be transmitted via PUR or SDT or early channel access messages, such as via a RACH procedure. By transmitting the indication via PUR or SDT, the energy required for transmitting the indication may be reduced since the WD may be able to transmit the indication without performing a connection setup with the network.

Upon receiving the message indicating that the WD has insufficient power level, the network, such as the network node, may update information of the energy status 1208 of the WD. The network node may keep the WD and its corresponding information, such as the UE context of the WD, for operation in IDLE mode. In other words, the network preserves the UE context of the WD in the core network until the WD has harvested a sufficient energy level for communicating with the network node, such as for the upcoming message exchange.

The procedure above may optionally be followed by a message from the WD to the network node indicating that the WD has sufficient energy for resuming communication.

Figure 5:
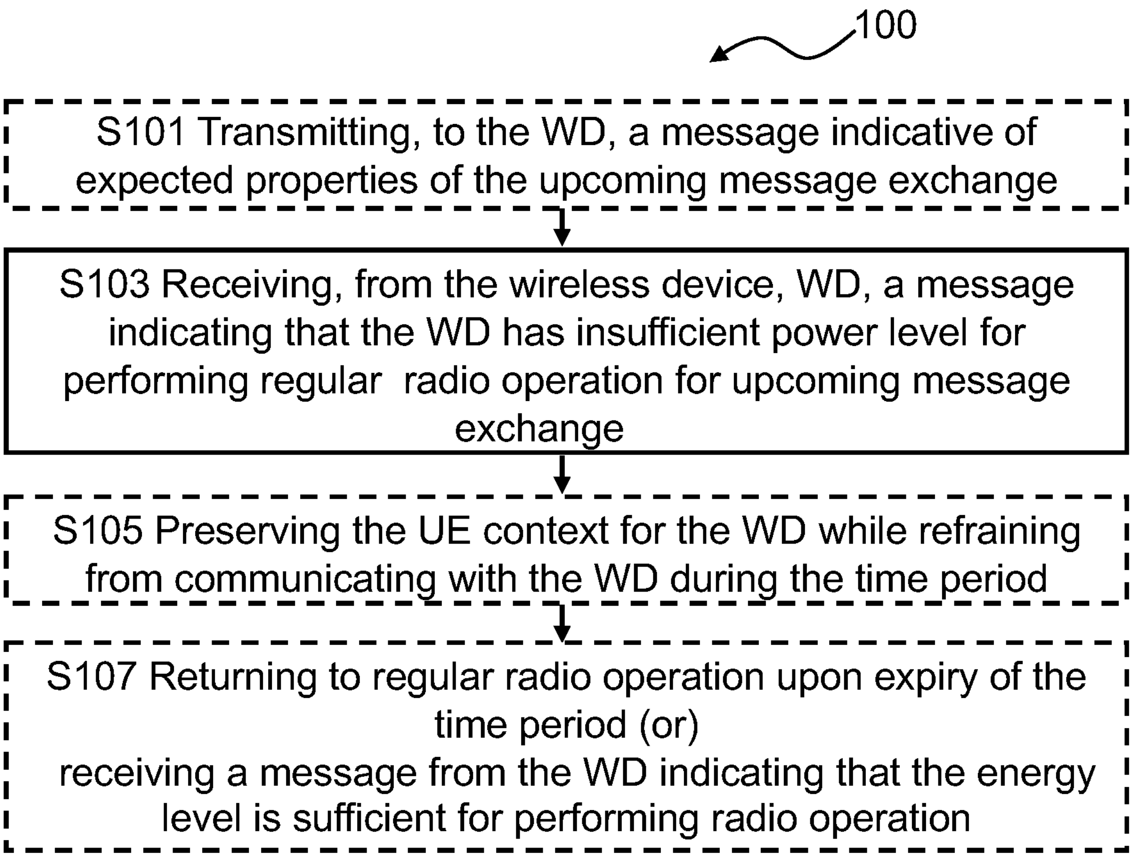
FIG. 5 is a flow-chart illustrating an example method, performed in a network node for prediction of an energy level of the wireless device according to this disclosure.

FIG. 5 shows a flow diagram of an example method 100, performed by a network node according to the disclosure for handling low energy conditions of an energy harvesting wireless device, WD, wherein the network node has a UE context of the WD received in a registration procedure stored. The method 100 may be performed by a network node, such as network node 800 of FIG. 7, such as network node 400 of FIG. 1, FIG. 3, and FIG. 4, CN node 600 of FIG. 1.

The method 100 comprises receiving S103, from the WD, a message indicating that the WD has insufficient power level for performing regular radio operation for upcoming message exchange and indicating that the UE context of the WD is to be preserved for a time period during which the power level is insufficient. Regular radio operation herein means that the WD is camping on a cell, performing cell measurements, doing cell reselection if needed, and/or monitors a paging channel for paging messages, as defined in 3GPP TS 38.304 v. 16.5.0, for the case of Idle mode operation. Not performing regular operation may herein mean that the WD is unable to perform one or more of these operations due to insufficient energy level. A message exchange herein means a transmission and/or a reception of a message, such as control signaling, data communication, and/or reading system information. In one or more example methods, the WD is operating in IDLE mode. The UE context being preserved may be seen as the network, such as the CN node 600, not discarding the UE context of the WD.

In one or more example methods, the message indicating an insufficient power level for performing radio operation is indicative of expected properties of the upcoming message exchange. In one or more example methods, the upcoming message exchange may be an Uplink (UL) data transmission, such as when the WD is in Radio Resource Control (RRC) connected mode and has data to transmit, the WD may indicate the expected properties of the upcoming message exchange to the network node. In one or more example methods, the expected properties may be one or more of an expected traffic volume and/or expected energy level, of an upcoming message exchange to the WD. In one or more example methods, the upcoming message exchange may be a scheduled preconfigured uplink transmission or early data transmission, such as carrying scheduled sensor data report at a scheduled time and/or predefined message size.

In one or more example methods, the method 100 comprises transmitting S101, to the WD, a message indicative of expected properties of the upcoming message exchange. In one or more example methods, the expected properties may be one or more of an expected traffic volume and/or expected energy level, of an upcoming message exchange to the WD. In one or more example methods, the message exchange may be initiated by the network node. This may for example be the case when the WD is in RRC IDLE mode or in RRC Inactive mode as defined in 3GPP TS 38.304 v. 16.5.0. In one or more example methods, the message indicative of expected properties of the upcoming message exchange is one or more of a paging signal and a wake-up signal.

In one or more example methods, the properties of the upcoming message exchange comprise one or more of an expected traffic volume, an expected traffic condition and an expected energy level. The traffic volume herein means a specific measured volume of data of the message exchanged, such as of a file transfer, or volume of data stored in a data buffer, such as an UL and/or DL buffer. Traffic condition herein means a traffic type, such as whether it is a continuous transmission or a specific traffic pattern and/or the associated typical data size, such as a traffic pattern being related to the application of the WD.

In one or more example methods, the message indicating the insufficient power level is a non-acknowledgement, NACK, message transmitted in response to the message indicative of expected properties of the upcoming message exchange. The NACK message may comprise additional information, such as the energy level of the WD, the WD's potential capability of harvesting energy and/or the time required to harvest a sufficient energy level.

In one or more example methods, the message indicating the insufficient power level comprises a code indicative of a predetermined energy condition of the WD. In one or more example methods, the indication can be done via a plurality of different specified codes, where each code can contain a certain information. In one or more examples, the indication can be done via a code A, a code B, or a code C. Transmission of these codes may indicate:

Code A: neither harvesting nor stored energy available, wait a time period, such as minutes/hours. The time period may indicate the time required to harvest a sufficient energy level for communication.

Code B: no energy storage device is available and harvesting energy is possible within a time period, such as min/hours.

Code C: harvesting and recharging energy storage device is on-going, pause the ongoing communication and resume communication after a time period.

Based on the received code the network node may determine the time period during which the WD may be absent while harvesting energy. In one or more example methods, the network node may, based on the determined time period, determine the time the network is to preserve the UE context of the WD. In one or more example methods, the network node may, based on the determined time period, determine when the network node may resume communication with the WD.

In one or more example methods, the message indicating the insufficient power level is received via Preconfigured Uplink Resources, PUR, Small Data Transmission, SDT, and/or a channel access message, such as a Random Access Channel (RACH) message. In one or more example methods, the SDT may use a RACH procedure to convey the message indicating the insufficient power level. In one or more example methods, such as when the WD is in IDLE mode, the message indicating the insufficient power level may be an un-solicitated transmission by the WD via PUR or SDT.

In one or more example methods, the message indicating the insufficient energy level may indicate that the energy level is not sufficient for any upcoming communication for a certain time. In one or more example methods, the message indicating the insufficient energy level may be indicative of the WDs potential capability of harvesting energy. For example, the message may indicate that the WD may harvest x mW of energy in y min or may indicate that a sufficient energy level may be harvested in a certain time period.

In one or more example methods, the properties of the upcoming message exchange are represented in a bitmap format. In one or more example methods, the properties of the upcoming message exchange are represented in a bitmap format indicative of traffic conditions of the WD.

In one or more example methods, the method 100 comprises preserving S105 the UE context for the WD while refraining from communicating with the WD during the time period. Preserving the UE context herein means storing all parameters agreed during the registration process between the WD and the network node. In other words, the network keeps information about the WD so that communication can resume without the WD having to perform a new registration process with the network. Refraining from communicating with the WD means that the network. node will not attempt any communication with the WD, such as exchanging messages with the WD. In other words, there will be no signaling between the network node and the WD when the network node refrains from communicating with the WD. Upon receiving the message indicating that the energy level is insufficient, the network node may know that the WD is unavailable due to insufficient energy level for communication. The network node may thus preserve the UE context of the WD, and thus keep the WD connected, until the WD has harvested a sufficient energy level for resuming communications.

In one or more example methods, the method 100 comprises returning S107 to regular radio operation upon expiry of the time period, such as the time period for which the WD has indicated that it has insufficient energy level, or upon receiving a message from the WD indicating that the energy level is sufficient for performing radio operation. Regular radio operation herein refers to the legacy radio operation as indicated in FIG. 2.

Figure 6:
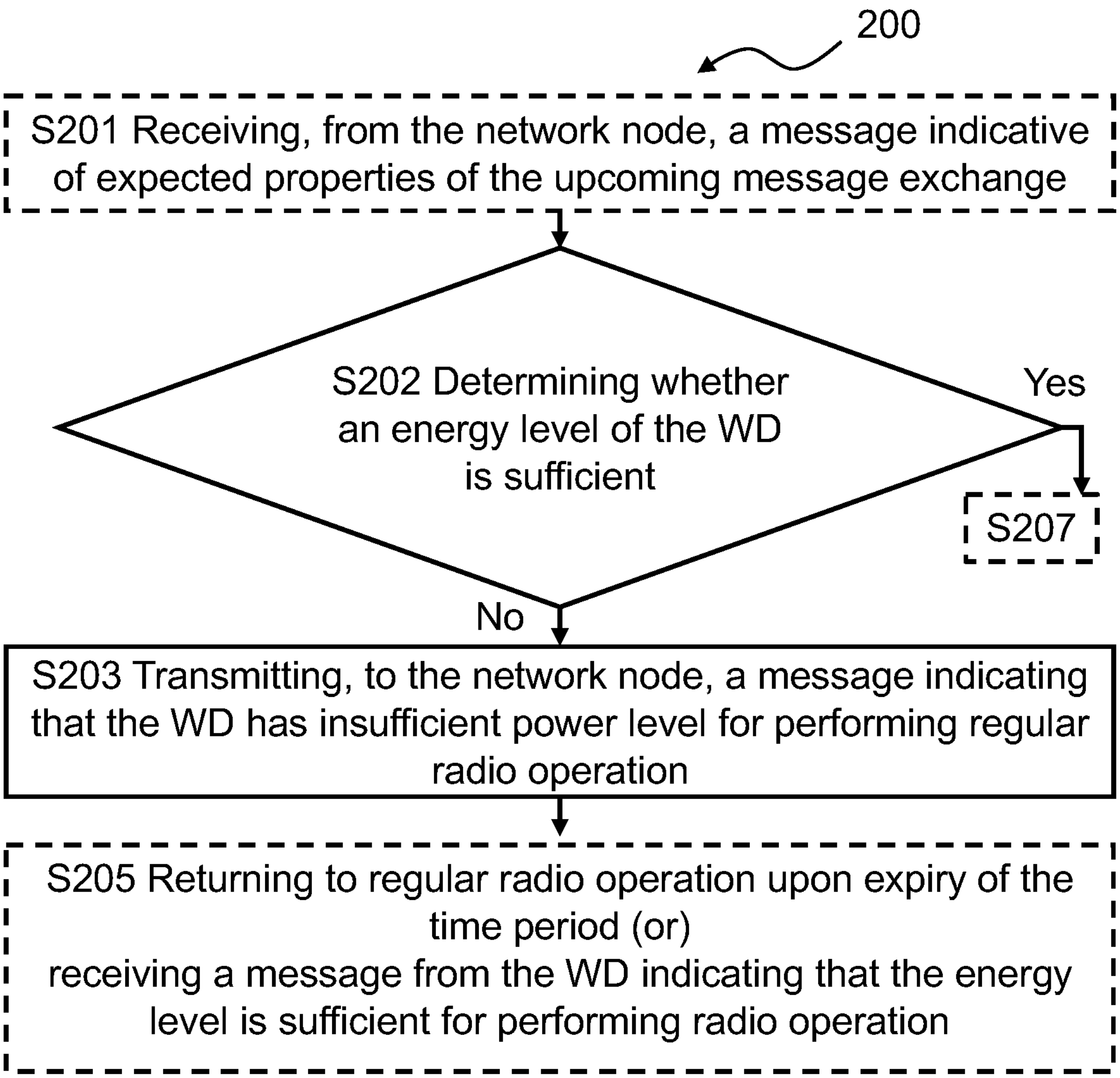
FIG. 6 is a flow-chart illustrating an example method, performed in a wireless device for enabling prediction of an energy level of the wireless device according to this disclosure.

FIG. 6 shows a flow diagram of an example method 200, performed in an energy harvesting wireless device, WD, according to the disclosure, for handling low energy conditions of the WD. The WD has a UE context generated during a registration procedure stored in the network, such as with the network node 400 of FIG. 1, and FIG. 6 or the core network node 600 of FIG. 1. The method 100 may be performed by an energy harvesting wireless device, such as energy harvesting wireless device 300 of FIG. 1, and FIG. 8.

The method 200 comprises determining S202 whether an energy level of the WD is sufficient for performing regular radio operation for an upcoming message exchange.

The method 200 comprises, upon determining that the energy level is insufficient for performing regular radio operation for the upcoming message exchange, transmitting S203, to the network node, a message indicating that the WD has insufficient power level for performing regular radio operation for upcoming message exchange and indicating that the UE context the WD is to be preserved for a time period during which the power level is insufficient. This action S203 corresponds to the action S103 performed by the network node as discussed in relation to FIG. 5.

In one or more example methods, the message indicating an insufficient power level for performing radio operation is indicative of expected properties of the upcoming message exchange. In one or more example methods, the upcoming message exchange may be an Uplink (UL) data transmission, such as when the WD is in Radio Resource Control (RRC) connected mode and has data to transmit, the WD may indicate the expected properties of the upcoming message exchange to the network node.

In one or more example methods, the method 200 comprises receiving S201, from the network node, a message indicative of expected properties of the upcoming message exchange. This may for example be the case when the WD is in RRC IDLE mode or in RRC Inactive mode as defined in 3GPP TS 38.304 v. 16.5.0. In one or more example methods, the message indicative of expected properties of the upcoming message exchange is one or more of a paging signal and a wake-up signal. This action S201 corresponds to the action S101 performed by the network node as discussed in relation to FIG. 5.

In one or more example methods, the properties of the upcoming message exchange comprise one or more of an expected traffic volume, an expected traffic condition and an expected energy level. The traffic volume herein means a specific measured volume of data of the message exchanged, such as of a file transfer, or volume of data stored in a data buffer, such as an UL and/or DL buffer. Traffic condition herein means a traffic type, such as whether it is a continuous transmission or a specific traffic pattern, such as a traffic patter being related to the application of the WD.

In one or more example methods, the message indicating the insufficient power level is a non-acknowledgement, NACK, message transmitted in response to the message indicative of expected properties of the upcoming message exchange.

In one or more example methods, the message indicating the insufficient power level comprises a code indicative of a predetermined energy condition of the WD. In one or more example methods, the indication can be done via a plurality of different specified codes, where each code can contain a certain information. In one or more examples, the indication can be done via a code A, a code B, or a code C. Transmission of these codes may indicate:

Code A: neither harvesting nor stored energy available, wait a certain time period, such as minutes/hours. The time period may indicate the time required to harvest a sufficient energy level for communication.

Code B: no energy storage device is available and harvesting energy is possible within a certain time period, such as min/hours.

Code C: harvesting and recharging energy storage device is on-going, pause the ongoing communication and resume communication after a certain time period.

In one or more example methods, the message indicating the insufficient power level is transmitted via Preconfigured Uplink Resources, PUR, Small Data Transmission, SDT, or a channel access message.

In one or more example methods, the properties of the upcoming message exchange are represented in a bitmap format.

In one or more example methods, transmitting S203 is performed upon triggering of an event. In one or more example methods, the event is the energy level of the WD being below an energy threshold. In one or more example methods, the event is the energy level of the WD being insufficient for a predicted energy level of the upcoming message exchange. In one or more example methods, the event is an instantaneous energy provided by energy harvesting is insufficient for operating a communication circuitry of the WD. In one or more example methods, the event is receiving a message initiating communication with the WD.

In one or more example methods, the method 200 comprises returning S205 to regular radio operation upon expiry of the time period or upon the energy level is sufficient for performing radio operation. This action S205 corresponds to the action S107 performed by the network node as discussed in relation to FIG. 5.

In one or more example methods, the WD is operating in IDLE mode.

Figure 7:
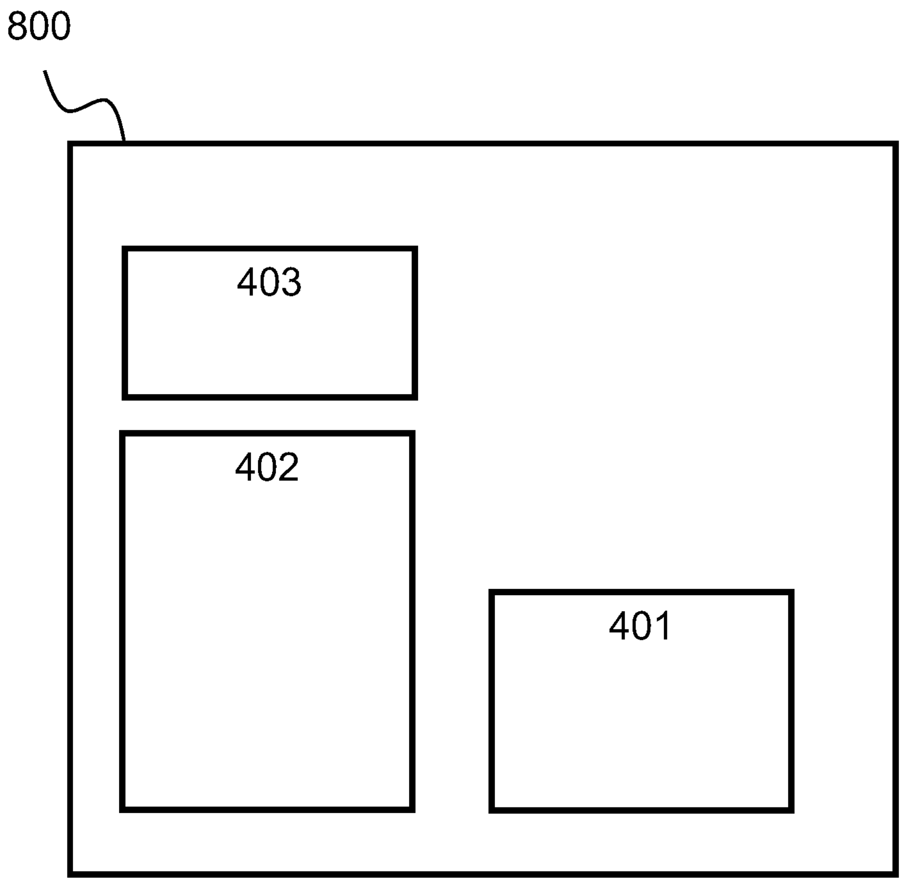
FIG. 7 is a block diagram illustrating an example network node according to this disclosure.

FIG. 7 shows a block diagram of an example network node 800 according to the disclosure. The network node 800 comprises memory circuitry 401, processor circuitry 402, and an interface 403. The interface 403 may be a wired and/or a wireless interface. The network node 800 may be configured to perform any of the methods disclosed in FIG. 5. In other words, the network node 800 may be configured for handling low energy conditions of an energy harvesting wireless device, WD (such as energy harvesting wireless device 300 of FIG. 1, and FIG. 7), wherein the network node has stored a UE context of the WD received in a registration procedure with the network, such as with the core network. The network node 800 may be a radio network node 400 or a core network node 600 communicating with the WD 300 via the radio network node 400.

The network node 800 is configured to receive (such as via the interface 403), from the WD, a message indicating that the WD has insufficient power level for performing regular radio operation for upcoming message exchange and indicating that the UE context of the WD is to be preserved for a time period during which the power level is insufficient.

The interface 403 may be configured for wireless communications via a wireless communication system, such as a 3GPP system, such as a 3GPP system supporting one or more of: New Radio, NR, Narrow-band IoT, NB-IoT, Long Term Evolution, LTE, and Long Term Evolution-enhanced Machine Type Communication, LTE-M, supporting various frequency range, such as millimeter-wave communications, operating in licensed band and/or unlicensed band.

Processor circuitry 402 is optionally configured to perform any of the operations disclosed in FIG. 4 (such as any one or more of S101, S105, S107). The operations of the network node 800 may be embodied in the form of executable logic routines (for example, lines of code, software programs, etc.) that are stored on a non-transitory computer readable medium (for example, memory circuitry 401) and are executed by processor circuitry 402).

Furthermore, the operations of the network node 800 may be considered a method that the network node 800 is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 7). Memory circuitry 401 is considered a non-transitory computer readable medium.

Memory circuitry 401 may be configured to store information (such as information related to energy conditions of the energy harvesting device, properties of an upcoming message exchange, and/or a UE context of the WD) in a part of the memory.

Figure 8:
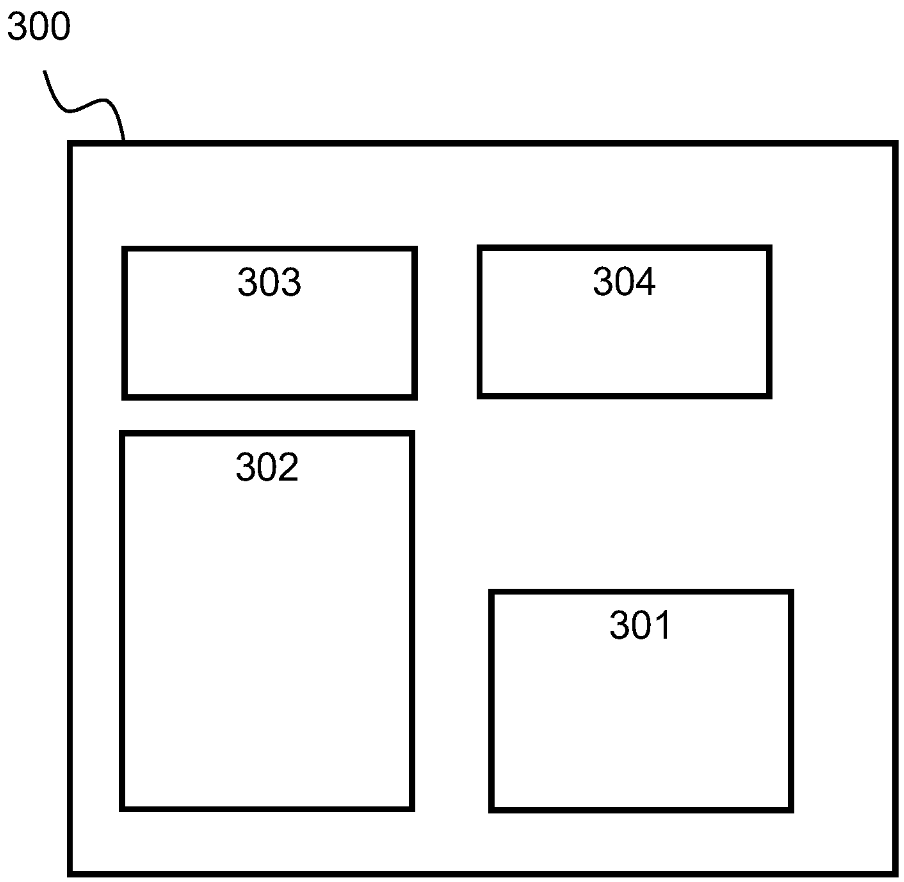
FIG. 8 is a block diagram illustrating an example wireless device according to this disclosure.

FIG. 8 shows a block diagram of an example wireless device 300 capable of harvesting energy according to the disclosure. The wireless device 300 comprises memory circuitry 301, processor circuitry 302, a wireless interface 303 and energy harvesting circuitry 304. The wireless device 300 may be configured to perform any of the methods disclosed in FIG. 5. In other words, the wireless device 300 may be configured for handling low energy conditions of the WD, wherein the WD has a UE context generated during a registration procedure with the network node stored in the network, such as in the core network. The network node may be the network node 400 or core network node 600 of FIG. 1, or the network node 800 of FIG. 7.

The wireless device 300 is configured to determine (such as using the processor circuitry 302), whether an energy level of the WD is sufficient for performing regular radio operation for an upcoming message exchange.

The wireless device 300 is configured to transmit (such as via the wireless interface 303), upon determining that the energy level is insufficient for performing regular radio operation for the upcoming message exchange, to the network node, a message indicating that the WD has insufficient power level for performing regular radio operation for upcoming message exchange and indicating that the UE context the WD is to be preserved for a time period during which the power level is insufficient.

The wireless interface 303 is configured for wireless communications via a wireless communication system, such as a 3GPP system, such as a 3GPP system supporting one or more of: New Radio, NR, Narrow-band IoT, NB-IoT, Long Term Evolution, LTE, and Long Term Evolution-enhanced Machine Type Communication, LTE-M, supporting various frequency range, such as millimeter-wave communications, operating in licensed band and/or unlicensed band.

The energy harvesting circuit 304 may be configured to harvest energy from an energy source. The energy source may be an ambient energy (such as light energy, wind energy and/or vibration energy), or a dedicated energy source (such as wireless power transfer). Ambient energy harvesting relies on energy resources that are readily available in the environment and that can be sensed by wireless devices capable of harvesting energy where dedicated energy harvesting are characterized by on-purpose energy transmissions from dedicated energy sources to the energy wireless devices capable of harvesting energy.

The wireless device 300 is optionally configured to perform any of the operations disclosed in FIG. 5 (such as any one or more of S201, S203, S205). The operations of the wireless device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the wireless device 300 may be considered a method that the wireless device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 8). Memory circuitry 301 is considered a non-transitory computer readable medium.

Memory circuitry 301 may be configured to store information (such as information related to energy conditions of the energy harvesting device, properties of an upcoming message exchange, and/or a UE context of the WD) in a part of the memory.

Examples of methods and products (network node and wireless device) according to the disclosure are set out in the following items:

Item 1. A method, performed in a network node, for handling low energy conditions of an energy harvesting wireless device, WD, wherein the network node has stored a UE context of the WD received during a registration procedure with the WD, the method comprising:
- receiving (S103), from the WD, a message indicating that the WD has insufficient power level for performing regular radio operation for upcoming message exchange and indicating that the UE context of the WD is to be preserved for a time period during which the power level is insufficient.

Item 2. The method according to item 1, wherein the message indicating an insufficient power level for performing radio operation is indicative of expected properties of the upcoming message exchange.

Item 3. The method according to item 1 or 2, wherein the method comprises:
- transmitting (S101), to the WD, a message indicative of expected properties of the upcoming message exchange.

Item 4. The method according to item 3, wherein the properties of the upcoming message exchange comprise one or more of an expected traffic volume, an expected traffic condition and an expected energy level.

Item 5. The method according to item 3 or 4, wherein the message indicative of expected properties of the upcoming message exchange is one or more of a paging signal and a wake-up signal.

Item 6. The method according to any of the items 3-5, wherein the message indicating the insufficient power level is a non-acknowledgement, NACK, message transmitted in response to the message indicative of expected properties of the upcoming message exchange.

Item 7. The method according to any of the items 1-6, wherein the message indicating the insufficient power level comprises a code indicative of a predetermined energy condition of the WD.

Item 8. The method according to any on the previous items, wherein the message indicating the insufficient power level is received via Preconfigured Uplink Resources, PUR, Small Data Transmission, SDT, or a channel access message.

Item 9. The method according to item 8, wherein the properties of the upcoming message exchange are represented in a bitmap format.

Item 10. The method according to any of the previous items, the method comprising:
- preserving (S105) the UE context for the WD while refraining from communicating with the WD during the time period.

Item 11. The method according to any of the previous items, the method comprising returning (S107) to regular radio operation upon one or more of:
- expiry of the time period, and
- receiving a message from the WD indicating that the energy level is sufficient for performing radio operation.

Item 12. The method according to any of the previous items, wherein the WD is operating in IDLE mode.

Item 13. A method, performed by an energy harvesting wireless device, WD, for handling low energy conditions of the WD, wherein the WD has a UE context generated during a registration procedure with the network node stored in the network, the method comprising:
- determining (S202) whether an energy level of the WD is sufficient for performing regular radio operation for an upcoming message exchange,
- upon determining that the energy level is insufficient for performing regular radio operation for the upcoming message exchange, transmitting (S203), to the network node, a message indicating that the WD has insufficient power level for performing regular radio operation for upcoming message exchange and indicating that the UE context the WD is to be preserved for a time period during which the power level is insufficient.

Item 14. The method according to item 13, wherein the message indicating an insufficient power level for performing radio operation is indicative of expected properties of the upcoming message exchange.

Item 15. The method according to item 13 or 14, wherein the method comprises:

receiving (S201), from the network node, a message indicative of expected properties of the upcoming message exchange.

Item 16. The method according to item 14, wherein the properties of the upcoming message exchange comprise one or more of an expected traffic volume, an expected traffic condition and an expected energy level.

Item 17. The method according to item 14 or 15, wherein the message indicative of expected properties of the upcoming message exchange is one or more of a paging signal or a wake-up signal.

Item 18. The method according to any of the items 15-17, wherein the message indicating the insufficient power level is a non-acknowledgement, NACK, message transmitted in response to the message indicative of expected properties of the upcoming message exchange.

Item 19. The method according to any of the items 13-18, wherein the message indicating the insufficient power level comprises a code indicative of a predetermined energy condition of the WD.

Item 20. The method according to any of the items 13-19, wherein the message indicating the insufficient power level is transmitted via Preconfigured Uplink Resources, PUR, Small Data Transmission, SDT, or a channel access message.

Item 21. The method according to item 20, wherein the properties of the upcoming message exchange are represented in a bitmap format.

Item 22. The method according to any of the items 13-21, wherein transmitting (S203) is performed upon triggering of an event, wherein the event is one or more of:

the energy level of the WD being below an energy threshold, the energy level of the WD being insufficient for a predicted energy level of the upcoming message exchange, an instantaneous energy provided by energy harvesting is insufficient for operating a communication circuitry of the WD, and upon receiving a message initiating communication with the WD.

Item 23. The method according to any of the items 13-22, the method comprising returning (S205) to regular radio operation upon one or more of:

expiry of the time period, and the energy level being sufficient for performing radio operation.

Item 24. The method according to any of the items 13-23, wherein the WD is operating in IDLE mode.

Item 25. A network node comprising memory circuitry, processor circuitry, and a wireless interface, wherein the network node is configured to perform any of the methods according to any of items 1-12.

Item 26. A wireless device comprising memory circuitry, processor circuitry, and a wireless interface, wherein the wireless device is configured to perform any of the methods according to any of items 13-24.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed in a network node, for handling low energy conditions of an energy harvesting wireless device (WD), the method comprising:

storing a UE context of the WD, the UE context having been received during a registration procedure with the WD; and receiving, from the WD, a message indicating that the WD has insufficient power level for performing regular radio operations for an upcoming message exchange and indicating that the UE context of the WD is to be preserved for a time period during which the power level is insufficient, wherein the preserving the UE context for the time period permits the network node and the WD to resume communications based on the preserved UE context without a requirement of performing a further registration procedure.

2. The method according to claim 1, wherein the message indicating an insufficient power level for performing radio operation is indicative of expected properties of the upcoming message exchange.

3. The method according to claim 1, further comprising: transmitting, to the WD, a message indicative of expected properties of the upcoming message exchange.

4. The method according to claim 3, wherein the properties of the upcoming message exchange comprise one or more of an expected traffic volume, an expected traffic condition and an expected energy level.

5. The method according to claim 3, wherein the message indicative of expected properties of the upcoming message exchange is one or more of a paging signal and a wake-up signal.

6. The method according to claim 3, wherein the message indicating the insufficient power level comprises a non-acknowledgement (NACK) message transmitted in response to the message indicative of expected properties of the upcoming message exchange.

7. The method according to claim 1, wherein the message indicating the insufficient power level comprises a code indicative of a predetermined energy condition of the WD.

8. The method according to claim 1, wherein the message indicating the insufficient power level is received via Preconfigured Uplink Resources (PUR), Small Data Transmission (SDT), or a channel access message.

9. The method according to claim 8, wherein properties of the upcoming message exchange are represented in a bitmap format.

10. The method according to claim 1, the method comprising:

preserving the UE context for the WD while refraining from communicating with the WD during the time period.

11. The method according to claim 1, further comprising returning to regular radio operation upon one or more of:

expiry of the time period, and/or receiving a message from the WD indicating that an energy level is sufficient for performing radio operation.

12. The method according to claim 1, wherein the WD is operating in IDLE mode.

13. A method, performed by an energy harvesting wireless device (WD) for handling low energy conditions of the WD, wherein the WD has a UE context generated during a registration procedure with a network node, wherein the UE context is stored in the network, the method comprising:

determining whether an energy level of the WD is sufficient for performing regular radio operation for an upcoming message exchange; and upon determining that the energy level is insufficient for performing regular radio operation for an upcoming message exchange, transmitting, to the network node, a message indicating:

that the WD has insufficient power level for performing regular radio operation for the upcoming message exchange; and that the UE context of the WD stored in the network is to be preserved for a time period during which the power level is insufficient, wherein the preserving the UE context for the time period permits the network node and the WD to resume communications based on the preserved UE context without a requirement of performing a further registration procedure.

14. The method according to claim 13, wherein the message indicating an insufficient power level for performing radio operation is indicative of expected properties of the upcoming message exchange.

15. The method according to claim 13, further comprising:

receiving, from the network node, a message indicative of expected properties of the upcoming message exchange.

16. The method according to claim 14, wherein the properties of the upcoming message exchange comprise one or more of an expected traffic volume, an expected traffic condition and an expected energy level.

17. The method according to claim 14, wherein the message indicative of expected properties of the upcoming message exchange is one or more of a paging signal or a wake-up signal.

18. The method according to claim 15, wherein the message indicating the insufficient power level comprises a non-acknowledgement (NACK) message transmitted in response to the message indicative of expected properties of the upcoming message exchange.

19. The method according to claim 13, wherein the message indicating the insufficient power level comprises a code indicative of a predetermined energy condition of the WD.

20. The method according to claim 13, wherein the message indicating the insufficient power level is transmitted via Preconfigured Uplink Resources (PUR), Small Data Transmission (SDT), or a channel access message.

* * * * *